UNITED STATES PATENT OFFICE.

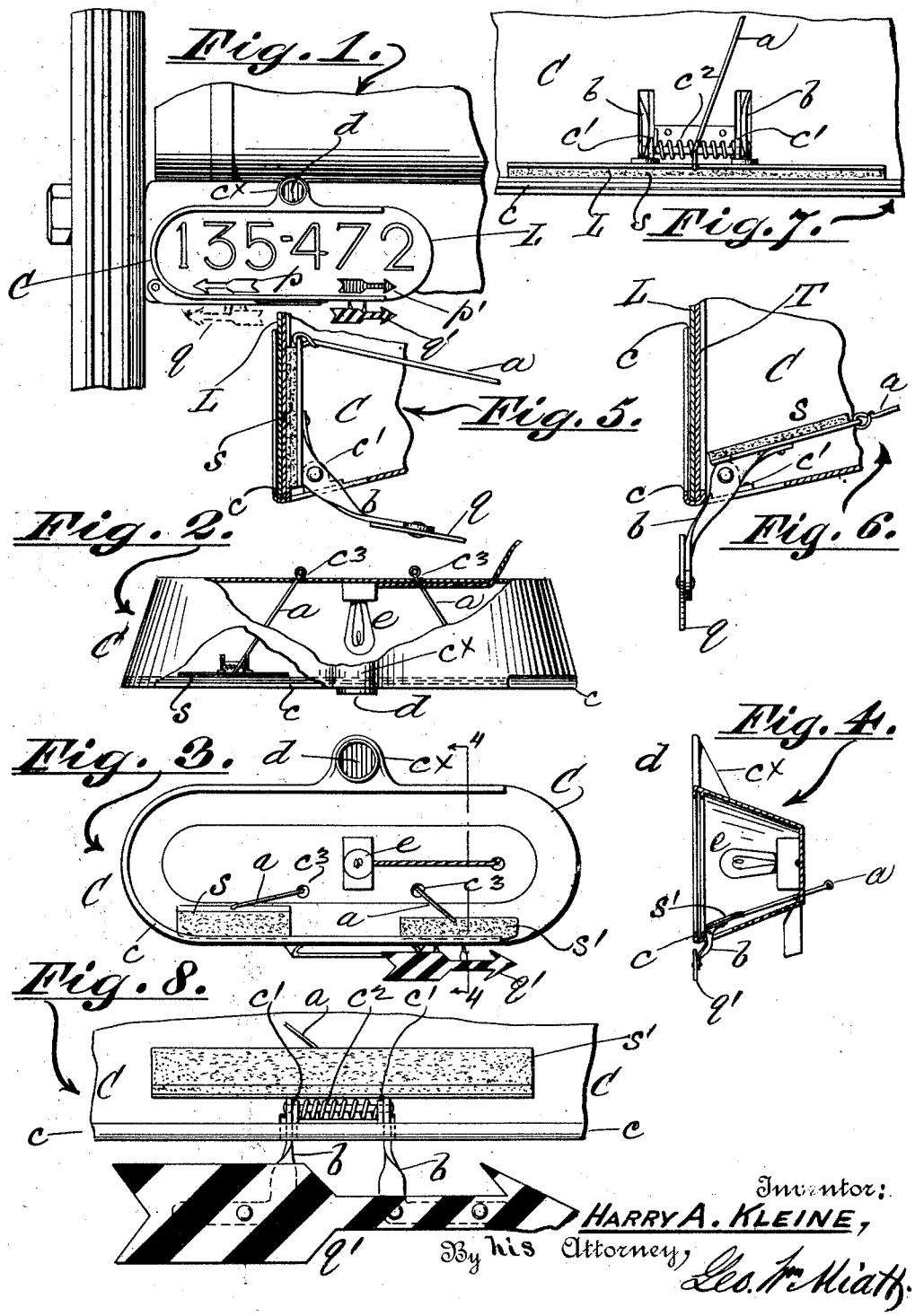

HARRY A. KLEINE, OF JERSEY CITY HEIGHTS, NEW JERSEY.

AUTO-LICENSE-INDICATING DEVICE.

1,372,436. Specification of Letters Patent. Patented Mar. 22, 1921.

Application filed October 2, 1920. Serial No. 414,304.

*To all whom it may concern:*

Be it known that I, HARRY A. KLEINE, a citizen of the United States, and a resident of Jersey City Heights, county of Hudson, and State of New Jersey, have invented certain new and useful Improvements in Auto-License-Indicating Devices, of which the following is a specification.

My improvements relate to the type of auto-license indicating devices disclosed in Letters Patent No. 1,342,850, issued to me June 8, 1920, and designed primarily not only to render visible the license number of an automobile after dark, but also for indicating the direction of travel of the vehicle at night,—my main objects in this case being to also afford means whereby more space is attained for the display of the license number by positioning the danger light opening or window above the latter instead of on the license number plate itself; and also to afford means whereby the direction of travel of the vehicle may be indicated visually in the day light as well as at night by practically the same operative parts, as hereinafter more fully set forth.

To this end my present invention consists essentially in the specific construction and arrangement of parts herein described and claimed,—distinctive features being the utilization of the shutter actuating mechanism for the purpose of displaying automatically retractable direction arrows as required, and the positioning of the danger light opening centrally above the license plate instead of having it form a part thereof as in my aforesaid Letters Patent, whereby I am enabled to add materially to the numbering capacity of the license plate (so as to meet present and expected requirements) without adding to the length of said plate, all as presently described in detail.

In the accompanying drawings,

Figure 1, is a rear view of a portion of an automobile, showing a face elevation of my improved indicating device;

Fig. 2, is a top view of the latter. the casing being partly broken away;

Fig. 3, is a face view of the casing, with the license plate, etc., omitted;

Fig. 4, is a section taken upon plane of line 4—4, Fig. 3, only with the shutter drawn back;

Fig. 5, is a sectional detail upon a larger scale, showing the normal position of the automatically retractable direction arrows, etc.;

Fig. 6, is a view like unto Fig. 5, showing one of the direction arrows advanced to signal the direction of travel;

Fig. 7, is a detail view showing a top view of one of the shutters, spring control, etc.;

Fig. 8, is an enlarged front detail view showing one of the shutters drawn back, and its attached direction arrow exposed to view.

In order to visualize the license number, etc., after dark, I provide, as in my aforesaid Letters Patent, a stenciled license plate L, and mount it on the front part of a casing C, containing an electric lamp *e*, or other illuminating means, as may be found most expedient. In the arrangement illustrated in the drawings, the incandescent lamp *e*, is presumably connected with an electric battery, or other source of electricity, suitably positioned on the vehicle.

The stenciled plate L, is preferably made of metal, and is removable from the casing C, being slidably mounted in a groove *c*, formed for its reception in the front of the casing C. The partly colored transparent back plate T, is also removably mounted in said groove *c*, contacting with the back of the license plate L, and conforming in shape thereto.

In addition to the stenciled license number, the license plate L, is formed with the two pointer openings *p*, *p'*, preferably of arrow shape as shown, or of any other shape or configuration desired provided they indicate the opposite lateral directions as related to the direct, normal, line of travel of the car. These two lateral direction indicators *p*, *p'*, are covered and closed at the rear of the license plate L, by colored (red) portions of the transparent back plate T, as in the arrangement shown in said Letters Patent, the rest of the said back plate T, being preferably colorless, so as to transmit the light unaltered through the license number stenciling, etc.

The red danger light or window *d*, has no curtain or shutter, and admits the transmission of light from the lamp *e*, continuously, as do the stencilings for the license number, etc.; but the pointer spaces *p*, *p'*, are covered normally by automatically closing shutters *s*, *s'*, which are withdrawn therefrom by positive means, as may be required at night, to indicate any intended change in the direction of travel. Thus, if the vehicle is to be turned to the right, the shutter s', is withdrawn from the rear of the left hand pointer p', allowing the latter to transmit light and designate the proposed change of direction of travel, as indicated in Fig. 1, whereas if a change of route is contemplated to the left of the vehicle, the pointer p, is uncovered,—the shutter of the right hand pointer p', being closed.

It is obvious that various forms of shutters may be used in connection with the direction indicators without departing from the spirit and intent of my invention in this respect,—the essential features in this connection being the automatic closing of the shutter and positive means for retracting same when required. Thus in the drawings I show each shutter s, s', pivotally supported at its lower edge between lugs c', c', with springs c², c², so positioned as to tend constantly to press the shutters s, s', against the inner side of the transparent plate T, thereby normally closing the pointer stencils p, p', against the transmission of light. To the upper edge of each shutter s, s', is articularly connected a link a, a, which extends through the casing C, and through a perforation c³, c³, formed for it in the back plate of said casing, as shown in Figs. 2 and 3. These links a, a, may be made of wire and formed with loops a, a', which not only afford means of attachment to flexible ligaments but also perform the function of stops to limit the outward thrust of the shutters s, s', when the plates L and T, are withdrawn from the slot c, of the casing, although the shutters s, s', are designed to rest normally against the back plate T, as before intimated, and for this reason are preferably faced with felt or other material adapted to exclude the passage of light from the lamp E.

As in my aforesaid patent, ligamentous connections extend from the links a, a, over suitable pulleys to levers or pedals conveniently positioned at or near the dash board of the machine, so that the shutters can be conveniently manipulated as desired for use during the exigencies of travel. It is of course to be understood that the optional and individual retraction of the shutters s, a', may be effected from the chauffeur's seat in the car by means of various well known mechanical expedients with like result, so that I do not limit myself to the identical means shown.

Thus far the above description applies to my device as embodied and shown both in the present application and in the patent hereinbefore referred to, the main novelty in the present case consisting in positioning the danger light d, above the license plate L, and in mounting pendent external auxiliary day light direction pointers q, q', on the shutters s, s', in such manner that said shutters and connections may be utilized to expose such external day light signals as required.

Thus, in Figs. 1, 2, 3 and 4, of the drawings the red danger light window d, is shown as positioned directly above the luminant e, in a dormer housing $c^x$, formed for the purpose in the top of the casing C, and communicating with the interior thereof, so as to derive light directly therefrom. By thus disposing of the danger signal light d, I gain more available space on the license plate L, in which to display the license number,—a problem which is becoming difficult without undue enlargement of the plate owing to the ever increasing number of machines licensed each year.

In suspending the external day light direction indicators q, q', on the shutters s, s', I adapt the latter to perform a double function in that they not only serve and control the pointer openings or windows p, p', in the license plate as heretofore, but also afford convenient means for the control and display of the said auxiliary external direction indicators q, q',—it being understood of course that if preferred said external day light signals q, q' may be actuated and controlled by equivalent duplicate means in which the shutters are replaced by the arms of bell crank levers, of which the shutters in the arrangement shown practically constitute a part. That is to say, the shutters s, s', and the bracket arms b, b, attached thereto, and on which the auxiliary external pointers q, q', are suspended, are essentially bell-crank levers actuated by the links a, a, as hereinbefore set forth. Hence, while the mechanical combination of the external or day light pointers q, q', with the shutters s, s', is practicable and advantageous in obviating the necessity of duplication of operative parts, and in effecting a simultaneous exposure of both night and day direction indicators, which is desirable under certain conditions, still the suspension of the day light or external indicators on the shutters is not indispensable.

Thus equipped however, my improved auto-license signaling device is simple and compact in construction and operation; and the simultaneous display of both night and day direction indicators is advantageous as manipulated by the same means and as affording additional precautionary measures to guard, at all times, and under all conditions of light, against accident.

I have herein shown my external direction indicators q, q', as of arrow shape, although I do not limit myself in this respect, since any other desired form of pointer may be substituted therefor with like result.

The brackets b, b', are shaped to extend and hold the external direction indicators $q$, $q'$, in visible, substantially vertical, position below the casing C, when a shutter is retracted, as in Figs. 1, 3, 4, 6 and 8, but to otherwise position said external direction indicators under the casing C, under normal conditions, as indicated particularly in Fig. 5, of the drawings.

What I claim as my invention and desire to secure by Letters Patent is,

1. An auto-license indicating device of the character designated, comprising a casing, illuminating means therein, a red danger signal window on the top of said casing positioned in a dormer housing open to the interior of said casing, a removable stenciled license plate formed with direction indicator openings and positioned in the front of the casing, a removable transparent back plate also positioned in front of the casing and formed with colored portions coincident with the direction indicator openings in the license plate, spring shutters in the casing arranged to normally cover said direction indicating openings in the license plate, and positive means for optionally and individually retracting said shutters.

2. An auto-license indicating device of the character designated, comprising a casing, illuminating means therein, a removable stenciled license plate formed with direction indicator openings and positioned in the front of the casing, a removable transparent back plate also positioned in front of the casing and formed with colored portions coincident with the direction indicator openings in the license plate, spring shutters in the casing arranged to normally cover said direction indicating openings in the license plate, external direction indicators mounted on said shutters, and positive means for optionally and individually retracting said shutters, for the purpose described.

3. An auto-license indicating device of the character designated, comprising a casing, illuminating means therein, a red danger signal window on the top of said casing positioned in a dormer housing open to the interior of said casing, a removable stenciled license plate formed with direction indicator openings and positioned in the front of the casing, a removable transparent back plate also positioned in front of the casing and formed with colored portions coincident with the direction indicator openings in the license plate, spring shutters in the casing arranged to normally cover said direction indicating openings in the license plate, external direction indicators mounted on said shutters, and positive means for optionally and individually retracting said shutters, for the purpose described.

4. An auto-license indicating device of the character designated, comprising a casing, illuminating means therein, a removable stenciled license plate formed with direction indicator openings and positioned in the front of the casing, a removable transparent back plate also positioned in front of the casing and formed with colored portions coincident with the direction indicator openings in the license plate, spring shutters in the casing arranged to normally cover said direction indicating openings in the license plate, external direction indicators pivotally mounted on said casing, and positive means for optionally and individually controlling said shutters and said external direction indicators, for the purpose described.

5. An auto-license indicating device of the character designated, comprising a casing, illuminating means therein, a removable stenciled license plate positioned in the front of the casing, external direction indicators pivotally mounted on said casing, and positive means for optionally and individually actuating and controlling said external direction indicators, for the purpose described.

HARRY A. KLEINE.

Witnesses:
 GEO. WM. MIATT,
 DOROTHY MIATT.